(12) United States Patent
Lai et al.

(10) Patent No.: US 9,471,190 B2
(45) Date of Patent: Oct. 18, 2016

(54) TOUCH PANEL MODULE

(71) Applicant: Novatek Microelectronics Corp., Hsinchu (TW)

(72) Inventors: Chih-Chang Lai, Taichung (TW); Yun-Hsiang Yeh, Hsinchu County (TW); Shih-Jung Lu, Hsinchu (TW); Wing-Kai Tang, Hsinchu (TW); Han-Chang Lin, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 14/558,642

(22) Filed: Dec. 2, 2014

(65) Prior Publication Data

US 2015/0309604 A1    Oct. 29, 2015

Related U.S. Application Data

(60) Provisional application No. 61/985,453, filed on Apr. 28, 2014.

(30) Foreign Application Priority Data

Oct. 14, 2014 (TW) .............................. 103135520 A

(51) Int. Cl.
*G06F 3/044* (2006.01)

(52) U.S. Cl.
CPC ..................................... *G06F 3/044* (2013.01)

(58) Field of Classification Search
CPC .... G06F 3/0418; G06F 3/044; G06F 3/0416; G06F 2203/04104
See application file for complete search history.

(56) References Cited

U.S. PATENT DOCUMENTS

| | | |
|---|---|---|
| 7,131,188 B2 | 11/2006 | Lin et al. |
| 8,502,794 B2 | 8/2013 | Chang |
| 8,531,426 B2 | 9/2013 | Chang |
| 8,614,684 B2 | 12/2013 | Chang |
| 8,614,685 B2 | 12/2013 | Chang |
| 8,614,686 B2 | 12/2013 | Chang |
| 8,614,687 B2 | 12/2013 | Chang |
| 8,614,688 B2 | 12/2013 | Chang |
| 8,730,193 B2 | 5/2014 | Chang et al. |

(Continued)

FOREIGN PATENT DOCUMENTS

TW    M422119    2/2012

OTHER PUBLICATIONS

"Office Action of Taiwan Counterpart Application", issued on Nov. 3, 2015, p. 1-p. 3, in which the listed reference was cited.

*Primary Examiner* — Shaheda Abdin
(74) *Attorney, Agent, or Firm* — Jianq Chyun IP Office

(57) ABSTRACT

A touch panel module including a touch panel area and a non-touch panel area is provided. The touch panel module includes a touch panel. The touch panel is located in the touch panel area. The touch panel senses a touch gesture by using a plurality of first and second sensing electrodes. At least one part of the first sensing electrodes is located in the non-touch panel area. Another one part of the first sensing electrodes and a whole of the second sensing electrodes are located in the touch panel area. The touch gesture touches the touch panel module to generate a touch area. A touch position corresponding to the touch gesture on the touch panel is determined based on a ratio of an area of the first sensing electrodes touched by the touch gesture and the touch area.

18 Claims, 4 Drawing Sheets

(56) References Cited

U.S. PATENT DOCUMENTS

| | | |
|---|---|---|
| 8,754,868 B2 | 6/2014 | Chang |
| 9,069,411 B2 | 6/2015 | Chang |
| 9,081,440 B2 | 7/2015 | Chang |
| 2011/0025638 A1 | 2/2011 | Salaverry et al. |
| 2012/0113032 A1* | 5/2012 | Itakura ............... G06F 3/044 345/173 |
| 2012/0113043 A1* | 5/2012 | Liu .................... G06F 3/044 345/174 |
| 2012/0169649 A1 | 7/2012 | Chang |
| 2012/0169650 A1 | 7/2012 | Chang |
| 2012/0169651 A1 | 7/2012 | Chang |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0218028 A1* | 8/2012 | Chu .................... G06F 3/044 327/517 |
| 2012/0299874 A1 | 11/2012 | Chang |
| 2012/0327028 A1 | 12/2012 | Chang et al. |
| 2013/0314376 A1 | 11/2013 | Chang |
| 2014/0300575 A1 | 10/2014 | Chang |
| 2015/0261360 A1 | 9/2015 | Chang |

* cited by examiner

TOUCH PANEL MODULE

CROSS-REFERENCE TO RELATED APPLICATION

This application claims the priority benefits of U.S. provisional application Ser. No. 61/985,453, filed on Apr. 28, 2014 and Taiwan application serial no. 103135520, filed on Oct. 14, 2014. The entirety of each of the above-mentioned patent applications is hereby incorporated by reference herein and made a part of this specification.

BACKGROUND OF THE INVENTION

1. Field of the Invention

The invention relates to a panel module, and more particularly, relates to a touch panel module.

2. Description of Related Art

With the blooming development in the touch technology, touch devices (such as cell phones, notebook computers or tablet computers, etc.) are capable of providing users an intuitive input method and an operating interface which are gradually favored by users and leaded to huge business opportunities. Therefore, it is an important issue for electronic products at this stage to accurately detecting touching operations performed by the users on the electronic products.

Generally, in conventional technology, a method for a touch panel to detect a touch position of a user is to calculate a correct coordinate position of the touch position by using differences between different sensing electrodes touched by the user when the user touches on a surface of the touch panel. However, a ratio of area distribution of conventional electrode patterns for different sensing electrodes at an edge area of touch panel is lack of changes, which results in that a capacitance variation changed through touch of the user is not obvious, such that the touch device may not be able to correctly detect the touch position because it is hard to calculate the correct coordinate position of the touch position.

SUMMARY OF THE INVENTION

The invention is directed to a touch panel module, which is capable of compensating a degree of linearity at an edge region of a touch panel, so as to improve an accuracy for determining a touch position by a touch controller.

A touch panel module of the invention includes a touch panel area and a non-touch panel area. The touch panel module includes a touch panel. The touch panel includes a plurality of sensing units configured to sense a touch gesture. Each of the sensing units includes a plurality of first sensing electrodes and a plurality of second sensing electrodes. An electrode area of the first sensing electrodes increases along a direction. An electrode area of the second sensing electrodes decreases along the direction. The touch panel is located in the touch panel area. The touch panel includes an active area and a non-active area. The touch gesture touches the touch panel module to generate a touch area. A ratio of an area of the first sensing electrodes touched by the touch gesture and the touch area increases along the direction, and the ratio is greater than a first threshold when the touch gesture moves from the non-active area towards the non-touch panel area along the direction.

In an embodiment of the invention, the ratio is greater than a second threshold when the touch gesture moves from the active area towards the non-active area along the direction.

In an embodiment of the invention, an area occupied by the first sensing electrodes in the non-active area is greater than an area occupied by the second sensing electrodes in the non-active area.

In an embodiment of the invention, the sensing units include a first sensing unit. The first sensing electrodes of the first sensing unit are electrically connected to a touch controller by using a first conductive wire in the non-active area. The second sensing electrodes of the first sensing unit are electrically connected to the touch controller by using a second conductive wire in the non-active area.

In an embodiment of the invention, the first sensing electrodes of the first sensing unit further extend into the non-active area in order to substantially fill a corresponding area in the non-active area excluding the first conductive wire and the second conductive wire.

In an embodiment of the invention, the sensing units include a second sensing unit. The first sensing electrodes of the second sensing unit extend from the active area into the non-active area.

In an embodiment of the invention, the second sensing electrodes of the second sensing unit extend from the active area into the non-active area, and separate the first sensing electrodes extended to the non-active area.

In an embodiment of the invention, the first sensing electrodes extended to the non-active area form a lumped electrode.

In an embodiment of the invention, the first sensing electrodes are further located in the non-touch panel area.

In an embodiment of the invention, the touch panel module further includes a touch controller. The touch controller is electrically connected to the touch panel, and configured to determine a touch position corresponding to the touch gesture on the touch panel based on the ratio of the area of the first sensing electrodes touched by the touch gesture.

In an embodiment of the invention, the touch controller is located in the non-touch panel area.

In an embodiment of the invention, the first sensing electrodes and the second sensing electrodes of each of the sensing units are arranged in staggered arrangement. Each of the first sensing electrodes has an extension bevel side. In the active area, the extension bevel sides of the first sensing electrodes extend along another direction opposite to the direction by a slope. The second sensing electrodes extend in the active area in accordance with an extending manner of the first sensing electrodes.

In an embodiment of the invention, the first sensing electrodes and the second sensing electrodes of each of the sensing units are arranged in staggered arrangement. Each of the first sensing electrodes has an extension curved side. The active area includes an edge area and a non-edge area. In the non-edge area, the extension curved sides of the first sensing electrodes extend along another direction opposite to the direction by a first slope. In the edge area, the extension curved sides of the first sensing electrodes extend along the another direction by a second slope different from the first slope. The second sensing electrodes extend in the active area in accordance with an extending manner of the first sensing electrodes.

In an embodiment of the invention, the non-active area of the touch panel surrounds the active area, and the direction is a direction pointing from a center area of the active area towards the non-active area.

A touch panel module of the invention includes a touch panel area and a non-touch panel area. The touch panel module includes a touch panel. The touch panel is located in the touch panel area. The touch panel senses a touch gesture by using a plurality of first and second sensing electrodes. At least one part of the first sensing electrodes is located in the non-touch panel area.

In an embodiment of the invention, another one part of the first sensing electrodes and a whole of the second sensing electrodes are located in the touch panel area.

In an embodiment of the invention, the touch panel includes an active area and a non-active area. An area occupied by the first sensing electrodes in the non-active area is greater than an area occupied by the second sensing electrodes in the non-active area.

In an embodiment of the invention, the touch gesture touches the touch panel module to generate a touch area. A touch position corresponding to the touch gesture on the touch panel is determined based on a ratio of an area of the first sensing electrodes touched by the touch gesture and the touch area.

In an embodiment of the invention, the touch panel includes an active area and a non-active area. In the active area, the first sensing electrodes and the second sensing electrodes are arranged in staggered arrangement. Each of the first sensing electrodes has an extension bevel side. The extension bevel sides of the first sensing electrodes extend along a direction away from the non-touch panel by a slope. The second sensing electrodes extend in the active area in accordance with an extending manner of the first sensing electrodes.

In an embodiment of the invention, the touch panel includes an active area and a non-active area. In the active area, the first sensing electrodes and the second sensing electrodes are arranged in staggered arrangement. Each of the first sensing electrodes has an extension curved side. The active area includes an edge area and a non-edge area. In the non-edge area, the extension curved sides of the first sensing electrodes extend along a direction away from the non-touch panel area by a first slope. In the non-edge area, the extension curved sides of the first sensing electrodes extend along the direction away from the non-touch panel area by a second slope different from the first slope. The second sensing electrodes extend in the active area in accordance with an extending manner of the first sensing electrodes.

Based on the above, in the exemplary embodiments of the invention, the first sensing electrodes are further located in the non-touch panel area to compensate the degree of linearity at the edge region of the touch panel, so as to improve the accuracy for determining the touch position by the touch controller.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
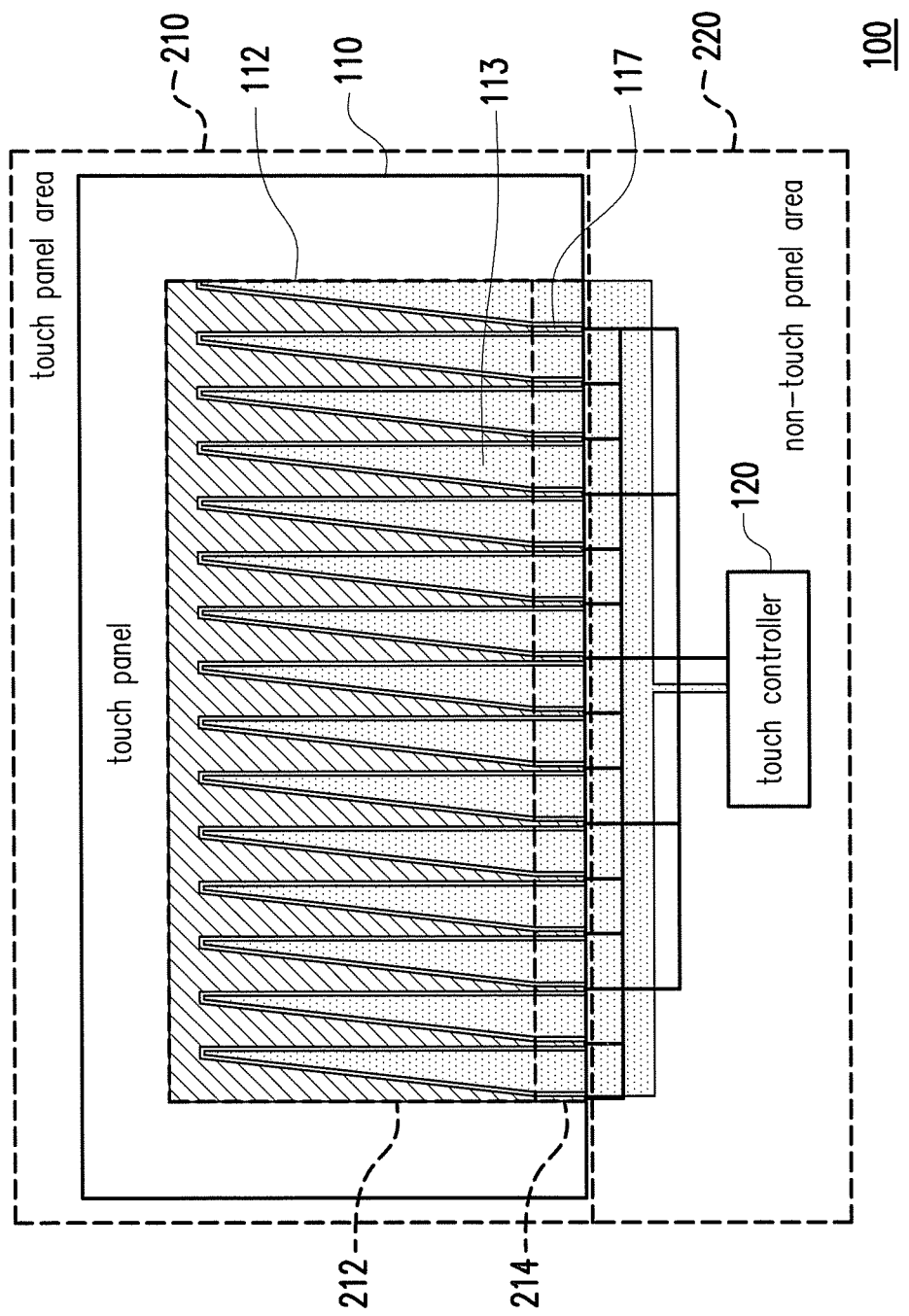
FIG. 1 is a schematic diagram illustrating a touch panel module according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments are provided below to describe the invention in detail, though the invention is not limited to the provided embodiments, and the provided embodiments can be suitably combined.

FIG. 1 is a schematic diagram illustrating a touch panel module according to an embodiment of the invention. Referring to FIG. 1, in the present embodiment, a touch panel module 100 includes a touch panel 110 and a touch controller 120. The touch panel 110 is located in a touch panel area 210 of the touch panel module 100, and the touch controller 120 is located in a non-touch panel area 220 of the touch panel module 100. In the present embodiment, the non-touch panel area 220 includes, for example, a flexible printed circuit (FPC) which is not illustrated. The touch panel 110 is electrically connected to an external circuit and the touch controller 120 by using the flexible printed circuit. The touch controller 120 is, for example, disposed on the flexible printed circuit, but the invention is not limited thereto. In other embodiments, the touch panel 110 may also be electrically connected to the external circuit by using other methods, and the touch controller 120 may also be located in a non-active area of the touch panel 110 (i.e., an area on the touch panel 110 excluding an active area 212).

In the present embodiment, the touch panel 110 includes a plurality of sensing units 112 configured to sense a touch gesture (not illustrated). The sensing units 112 are, for example, located in the active area 212 of the touch panel 110. The non-active area of the touch panel 110 includes a fan-out area 214. The fan-out area 214 includes a plurality of conductive wires 117 located therein, or extensions of sensing electrodes 113. The touch panel 110 electrically connects the sensing electrodes 113 in the sensing units 112 to the external circuit and the touch controller 120 by using the conductive wires 117 or the extensions of the sensing electrodes 113. It should be noted that, in the present embodiment, an amount of the sensing units 112, a layout pattern of the sensing electrodes 113 therein and a wiring method in the an-out area 214 are only illustrative instead of limiting the invention. Moreover, a size of each area in the touch panel module 100, a size of the sensing unit 112 and a ratio of the two are only illustrative instead of limiting the invention.

Figure 2:
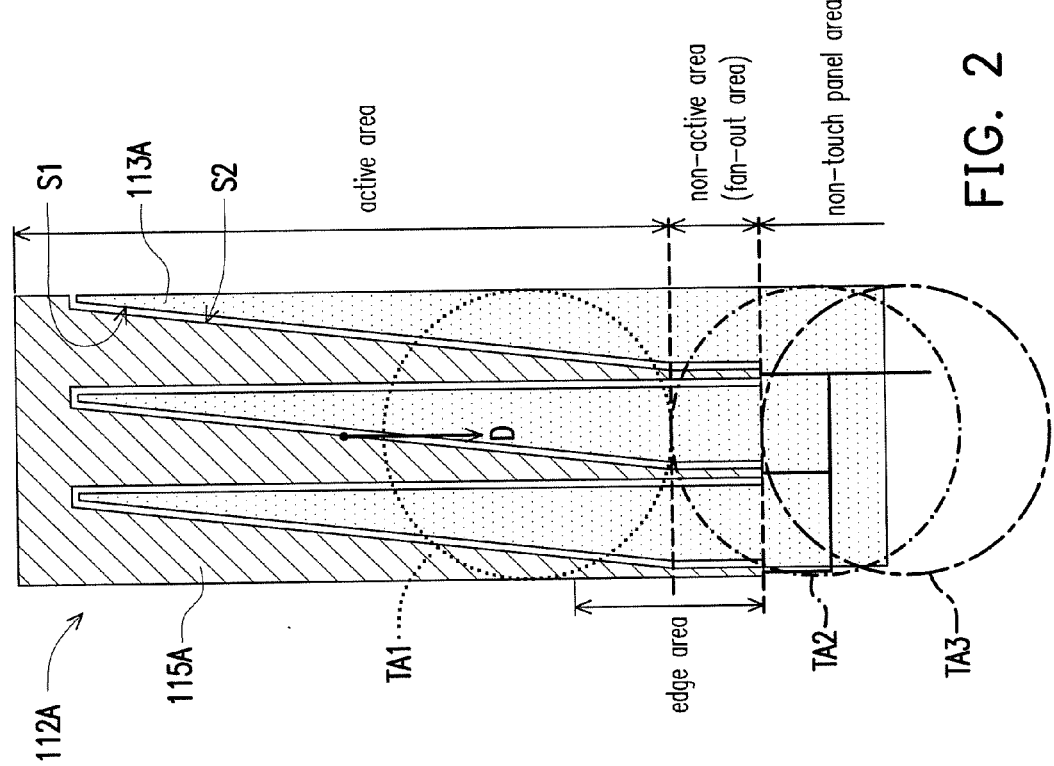
FIG. 2 is a schematic diagram illustrating an electrode pattern of sensing units according to an embodiment of the invention.

FIG. 2 is a schematic diagram illustrating an electrode pattern of sensing units according to an embodiment of the invention. Referring to FIG. 1 and FIG. 2, the touch panel 110 of the embodiment of FIG. 1 includes a plurality of sensing units 112 configured to sense the touch gesture. FIG.

2 illustrates one of implementation examples for the electrode pattern of the sensing units 112. In the present embodiment, the sensing units 112 include a second sensing unit 112A. The second sensing unit 112A includes a plurality of first sensing electrodes 113A and a plurality of second sensing electrodes 115A. An area electrode of the first sensing electrodes 113A increases along a direction D, and an electrode area of the second sensing electrodes 115A decreases along the direction D. In the present embodiment, the direction D is a specific direction pointing from a center area of the active area 212 towards the fan-out area 214 of the non-active area.

In the present embodiment, the first sensing electrodes 113A and the second sensing electrodes 115A are arranged in staggered arrangement. The first sensing electrode 113A and the second sensing electrode 115A include extension bevel sides S1 and S2 respectively. In the active area 212, the extension bevel sides S1 of the first sensing electrodes 113A extend along another direction opposite to the direction D by a specific slope. The second sensing electrodes 115B extend in the active area 212 in accordance with an extending manner of the first sensing electrodes 113A, and the second sensing electrodes 115B and the first sensing electrodes 113A are arranged in staggered arrangement. Therefore, in the present embodiment, extending directions of the first sensing electrodes 113A and the second sensing electrodes 115A are opposite to each other.

In the present embodiment, the first sensing electrodes 113A extend from the active area 212 into the fan-out area 214 of the non-active area. The second sensing electrodes 115A also extend from the active area 212 into the fan-out area 214 of the non-active area, and separate the first sensing electrodes 113A extended to the fan-out area 214 of the non-active area, as shown in FIG. 2. Therefore, in the present embodiment, an area occupied by the first sensing electrodes 113A in the non-active area is greater than an area occupied by the second sensing electrodes 115A in the non-active area.

In the present embodiment, the first sensing electrodes 113A are further located in the non-touch panel area 220 to compensate a degree of linearity at an edge region of the touch panel 110, so as to improve an accuracy for determining the touch position by the touch controller 120. In other words, in the present exemplary embodiment, at least one part of the first sensing electrodes 113A is located in the non-touch panel area 220. Furthermore, another one part of the first sensing electrodes 113A and a whole of the second sensing electrodes 115A are located in the active area 212 and the fan-out area 214 of the non-active area of the touch panel area 210. Therefore, in the present exemplary embodiment, the second sensing unit 112A includes, for example, the first sensing electrodes 113A, the second sensing electrodes 115A, extensions of the two in the non-active area and the first sensing electrodes 113A located in the non-touch panel area 220.

Specifically, referring to FIG. 1, for example, the touch controller 120 determines a touch position corresponding to the touch gesture on the touch panel 110 based on a ratio of an area of the first sensing electrodes 113A touched by the touch gesture and a touch area generated by the touch gesture touched on the touch panel module 100.

Take the edge area of the touch panel 110 as an example, assuming that the touch gesture touches the second sensing unit 112A so that a touch area TA2 is generated thereon, the touch controller 120 is capable of determining the touch position of the touch gesture on the touch panel 110 based on a ratio of the touch area TA2 occupied by the first sensing electrodes 113A. For instance, in this example, the area of the first sensing electrodes 113A and the area of the second sensing electrodes 115A which are touched by the touch gesture are A2 and B2 respectively. Therefore, a ratio of the touch area TA2 occupied by the area A2 of the first sensing electrodes 113A touched by the touch gesture is substantially A2/(A2+B2). Accordingly, the touch controller 120 can determine that the touch position of the touch gesture occurs on a position corresponding to the touch area TA2 in the edge area on the touch panel 110.

Take the non-display panel area 220 as another example, in which it is assumed that the touch gesture touches the second sensing unit 112A to generate a touch area TA3 thereon. In this example, a touch position of the touch area TA3 is farther away from the active area 212 as compared to the touch area TA2. The area of the first sensing electrodes 113A and the area of the second sensing electrodes 115A which are touched by the touch gesture are A3 and B3 respectively. Therefore, a ratio of the touch area TA3 occupied by the area A3 of the first sensing electrodes 113A touched by the touch gesture is substantially A3/(A3+B3).

It is worth mentioning that, in the present exemplary embodiment, the ratio A3/(A3+B3) of the touch area TA3 occupied by the area A3 of the first sensing electrodes 113A touched by the touch gesture is substantially greater than the ratio A2/(A2+B2) of the touch area TA2 occupied by the area A2 of the first sensing electrodes 113A touched by the touch gesture. Therefore, in the present exemplary embodiment, the ratio A2/(A2+B2) of the area A2 of the first sensing electrodes 113A touched by the touch gesture and the touch area TA2 increases along the direction D. In other words, the ratio A2/(A2+B2) may serve as a first threshold, and when the touch gesture moves from the fan-out area 214 of the non-active area towards the non-touch panel area 220 along the direction D, the ratio A3/(A3+B3) of the area A3 of the first sensing electrodes 113A touched by the touch gesture and the touch area TA3 generated by the touch gesture touched on the touch panel module 100 is greater than the first threshold.

In addition, take the active area 212 as another example, in which it is assumed that the touch gesture touches the second sensing unit 112A to generate a touch area TA1 thereon. In this example, a touch position of the touch area TA1 is farther away from the non-touch area 220 as compared to the touch areas TA2 and TA3. The area of the first sensing electrodes 113A and the area of the second sensing electrodes 115A which are touched by the touch gesture are A1 and B1 respectively. Therefore, a ratio of the touch area TA1 occupied by the area A1 of the first sensing electrodes 113A touched by the touch gesture is substantially A1/(A1+B1). Accordingly, the touch controller 120 can determine that the touch position of the touch gesture occurs on a position corresponding to the touch area TA1 on the touch panel 110.

In the present exemplary embodiment, the ratio A1/(A1+B1) of the touch area TA1 occupied by the area A1 of the first sensing electrodes 113A touched by the touch gesture is substantially less than the ratio A2/(A2+B2) of the touch area TA2 occupied by the area A2 of the first sensing electrodes 113A touched by the touch gesture. Therefore, in the present exemplary embodiment, the ratio A1/(A1+B1) of the area A1 of the first sensing electrodes 113A touched by the touch gesture and the touch area TA1 increases along the direction D. In other words, the ratio A1/(A1+B1) may serve as a second threshold, and when the touch gesture moves from the active area 212 towards the fan-out area 214 of the non-active area along the direction D, the ratio A2/(A2+B2)

of the area A2 of the first sensing electrodes 113A touched by the touch gesture and the touch area TA2 generated by the touch gesture touched on the touch panel module 100 is greater than the second threshold.

Therefore, in the present exemplary embodiment, at least by using the first sensing electrodes 113A located in the non-touch panel 220, when the touch gesture moves from the center area of the touch panel 110 towards the edge area, the area of the first sensing electrodes touched by the touch gesture increases significantly. Accordingly, the ratio of the area of the first sensing electrodes touched by the touch gesture and the touch area generated by the touch gesture touched on the touch panel module may also increase significantly to compensate the degree of linearity at the edge area of the touch panel 110, so as to improve the accuracy for determining the touch position by the touch controller 120.

In the exemplary embodiments of the invention, a layout scheme of the electrode pattern in the fan-out area 214 of the non-active area is not limited only to the extensions of the first sensing electrodes 113A and the second sensing electrodes 115A. In other embodiments, based on the actual design requirements, the fan-out area 214 of the non-active area may include a plurality of conductive wires.

Figure 3:
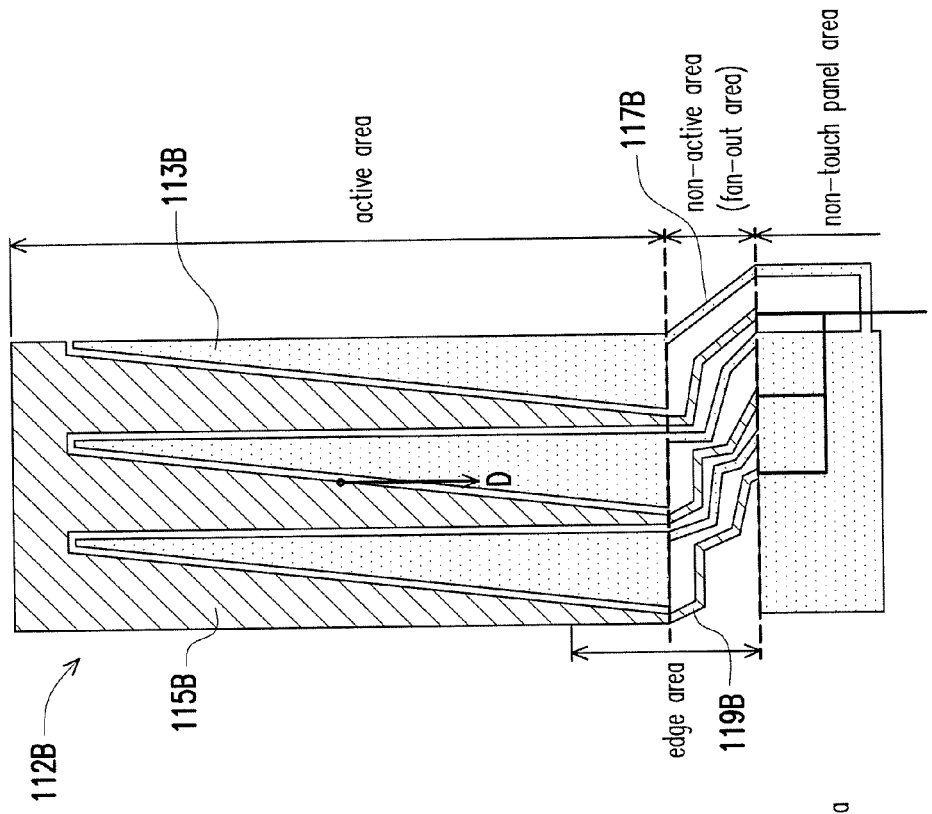
FIG. 3 is a schematic diagram illustrating an electrode pattern of sensing units according to another embodiment of the invention.

FIG. 3 is a schematic diagram illustrating an electrode pattern of sensing units according to another embodiment of the invention. Referring to FIG. 1 and FIG. 3, in the present embodiment, the sensing units 112 include a first sensing unit 112B. In the present embodiment, an electrode pattern of the first sensing unit 112B is similar to what illustrated in the embodiment of FIG. 2, and a major difference between the two is that, for example, a layout scheme of the electrode pattern in the fan-out area 214 of the non-active area.

Specifically, in the present embodiment, the first sensing electrodes 113B of the first sensing unit 112B are electrically connected to the touch controller 120 by using a first conductive wire 117B in the fan-out area 214 of the non-active area. The second sensing electrodes 115B of the first sensing unit 112B are electrically connected to the touch controller 120 by using a second conductive wire 119B in the fan-out area 214 of the non-active area. As similar to the embodiment of FIG. 2, in the present embodiment, the first sensing electrodes 113B are further located in the non-touch panel area 220 to compensate the degree of linearity at the edge region of the touch panel 110, so as to improve the accuracy for determining the touch position by the touch controller 120. Therefore, in the present exemplary embodiment, the first sensing unit 112B includes, for example, the first sensing electrodes 113B, the second sensing electrodes 115B, the first conductive wire 117B, the second conductive wire 119B and the first sensing electrodes 113B located in the non-touch panel area 220.

In the present embodiment, when the touch gesture moves from the active area 212 towards the fan-out area 214 of the non-active area, the ratio of the area of the first sensing electrodes 113B touched by the touch gesture and the touch area generated by the touch gesture touched on the touch panel module 100 is greater than a second threshold. When the touch gesture moves from the fan-out area 214 of the non-active area towards the non-touch panel area 220, the ratio of the area of the first sensing electrodes 113B touched by the touch gesture and the touch area generated by the touch gesture touched on the touch panel module 100 is greater than a first threshold. Enough teaching, suggestion, and implementation illustration regarding above said operations may be obtained from the embodiment of FIG. 2, which is not repeated hereinafter. In the present embodiment, the layout scheme of the electrode pattern in the fan-out area 214 of the non-active area is different from that in the embodiment of FIG. 2. Therefore, values of the first threshold and the second threshold in the present embodiment may also be different accordingly, and the invention is not limited thereto.

In the exemplary embodiments of the invention, the layout scheme of the electrode pattern in the fan-out area 214 of the non-active area is not limited only to the conductive wires located in the fan-out area 214. In other embodiments, based on actual design requirements, the first sensing electrodes may be further filled into an area excluding the conductive wires in the fan-out area 214 of the non-active area, so as to compensate the degree of linearity at the edge region of the touch panel 110.

Figure 4:
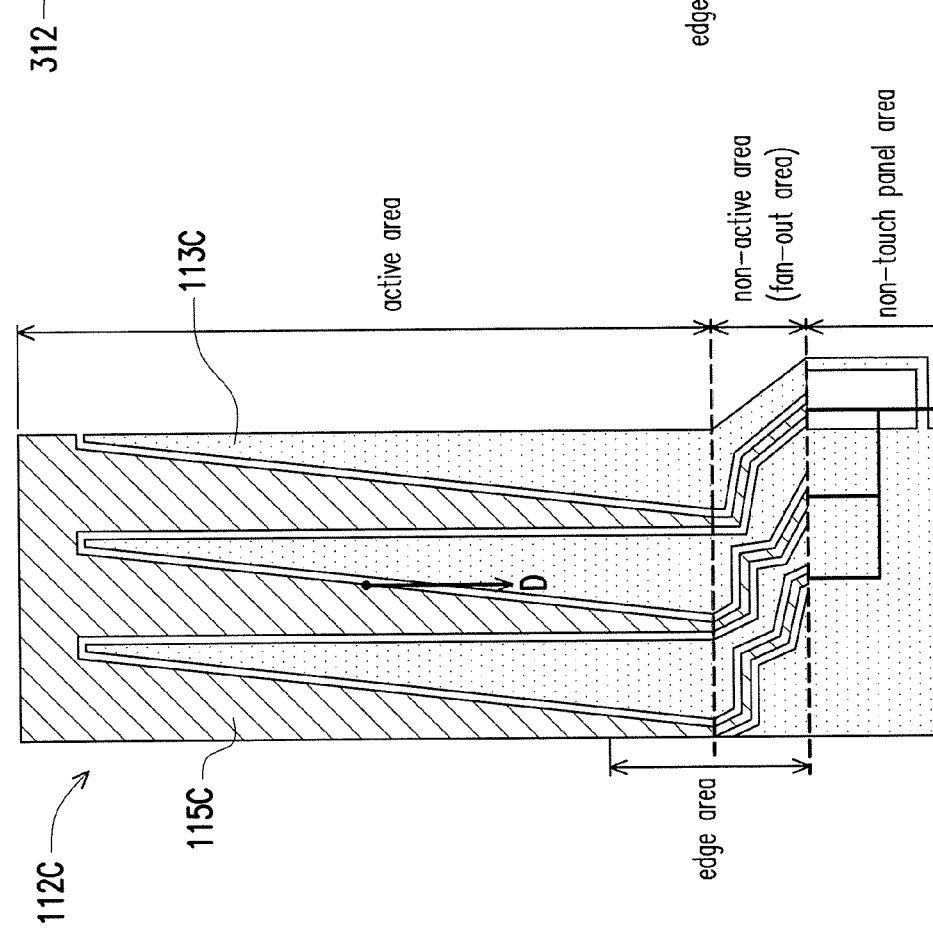
FIG. 4 is a schematic diagram illustrating an electrode pattern of sensing units according to another embodiment of the invention.

FIG. 4 is a schematic diagram illustrating an electrode pattern of sensing units according to another embodiment of the invention. Referring to FIG. 1 and FIG. 4, an electrode pattern of a first sensing unit 112C is similar to that in the embodiment of FIG. 3, and a major difference between the two is that, for example, the first sensing electrodes 113C further extend into the fan-out area 214 of the non-active area in order to substantially fill a corresponding area in the fan-out area 214 of the non-active area excluding the first conductive wire and the second conductive wire, as shown in FIG. 4.

As similar to the embodiment of FIG. 2, in the present embodiment, when the touch gesture moves from the active area 212 towards the fan-out area 214 of the non-active area, the ratio of the area of the first sensing electrodes 113C touched by the touch gesture and the touch area generated by the touch gesture touched on the touch panel module 100 is greater than a second threshold. When the touch gesture moves from the fan-out area 214 of the non-active area towards the non-touch panel area 220, the ratio of the area of the first sensing electrodes 113C touched by the touch gesture and the touch area generated by the touch gesture touched on the touch panel module 100 is greater than a first threshold. Enough teaching, suggestion, and implementation illustration regarding above said operations may be obtained from the embodiment of FIG. 2, which is not repeated hereinafter. In the present embodiment, the layout scheme of the electrode pattern in the fan-out area 214 of the non-active area is different from that in the embodiment of FIG. 2. Therefore, values of the first threshold and the second threshold in the present embodiment may also be different accordingly, and the invention is not limited thereto.

In the exemplary embodiments of the invention, a layout scheme of the electrode pattern in the fan-out area 214 of the non-active area is not limited only to the implementation in which the second sensing electrodes 115A separate the first sensing electrodes 113A. In other embodiments, based on actual design requirements, the first sensing electrodes in the fan-out area 214 of the non-active area may also be a whole lumped electrode not separated by the second sensing electrodes 115A, so as to compensate the degree of linearity at the edge region of the touch panel 110.

Figure 5:
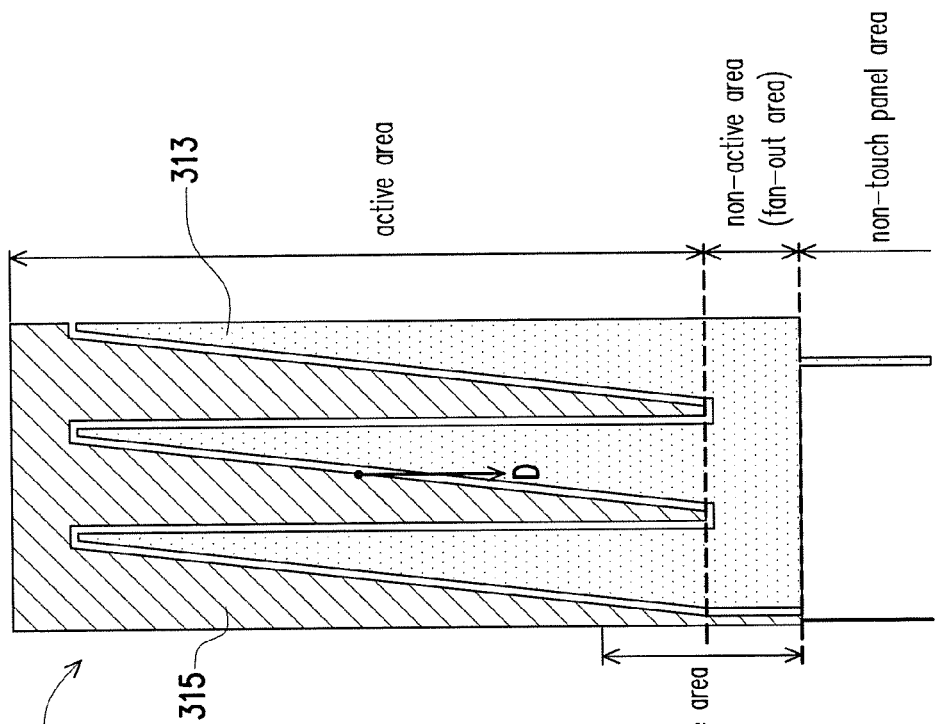
FIG. 5 is a schematic diagram illustrating an electrode pattern of sensing units according to another embodiment of the invention.

FIG. 5 is a schematic diagram illustrating an electrode pattern of sensing units according to another embodiment of the invention. Referring to FIG. 1 and FIG. 5, in the present embodiment, an electrode pattern of a second sensing unit 312 is similar to that in the embodiment of FIG. 3, and a major difference between the two is that, for example, first sensing electrodes 313 of the second sensing unit 312 extend from the active area 212 towards the fan-out area 214 of the non-active area. Also, the first sensing electrodes 313 extended to the fan-out area 214 of the non-active area form a lumped electrode, as shown in FIG. 5.

As similar to the embodiment of FIG. 2, in the present embodiment, when the touch gesture moves from the active area 212 towards the fan-out area 214 of the non-active area, the ratio of the area of the first sensing electrodes 313 touched by the touch gesture and the touch area generated by the touch gesture touched on the touch panel module 100 is greater than a second threshold. When the touch gesture moves from the fan-out area 214 of the non-active area towards the non-touch panel area 220, the ratio of the area of the first sensing electrodes 313 touched by the touch gesture and the touch area generated by the touch gesture touch on the touch panel module 100 is greater than a first threshold. Enough teaching, suggestion, and implementation illustration regarding above said operations may be obtained from the embodiment of FIG. 2, which is not repeated hereinafter. In the present embodiment, the layout scheme of the electrode pattern in the fan-out area 214 of the non-active area is different from that in the embodiment of FIG. 2. Therefore, values of the first threshold and the second threshold in the present embodiment may also be different accordingly, and the invention is not limited thereto.

It is worth mentioning that, the embodiment of FIG. 5 may also be properly combined with the embodiments of FIG. 2 to FIG. 4. That is to say, in the embodiment of FIG. 5, the first sensing electrodes 313 may further be located in the non-touch panel area 220 to compensate the degree of linearity at the edge region of the touch panel 110, so as to improve the accuracy for determining the touch position by the touch controller 120.

In the exemplary embodiments of the invention, a layout scheme of the electrode patterns of the first sensing electrodes and the second sensing electrodes in the active area is not limited to the implementation in which the extension bevel sides of each sensing electrode extend towards two opposite directions by a specific slope. In other embodiments, based on the actual design requirements, the sides of each sensing electrode may also be curved sides having different slopes.

Figure 6:
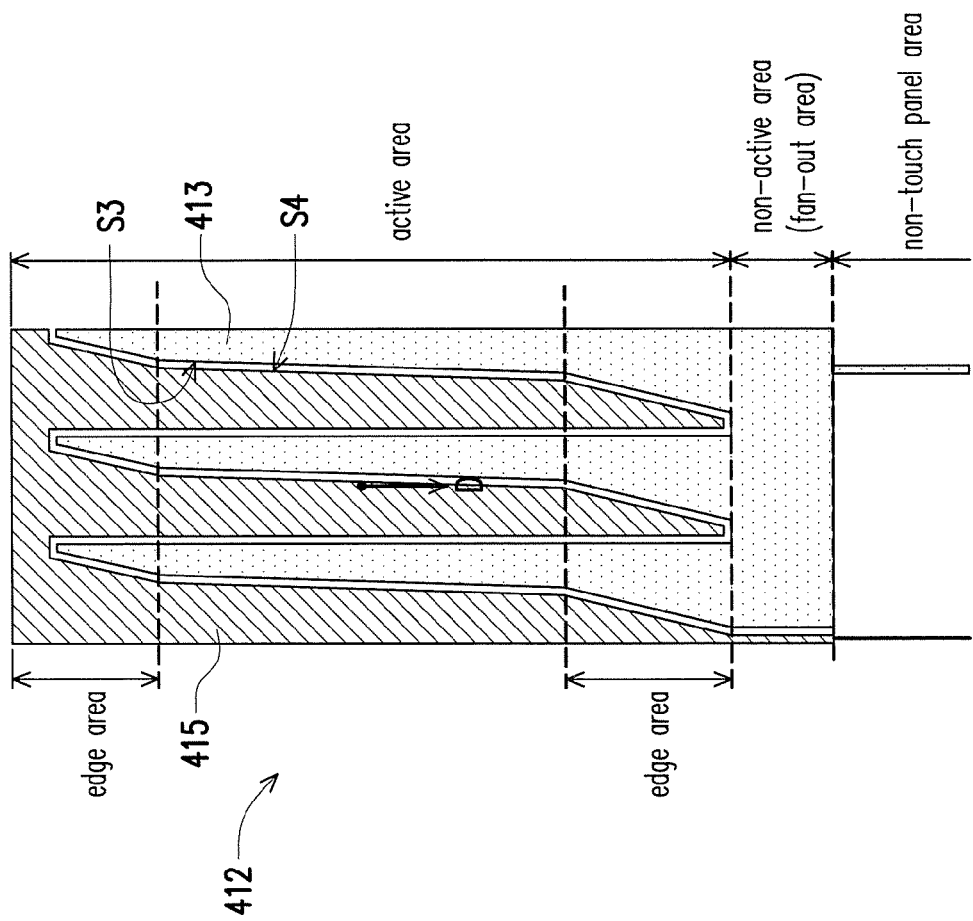
FIG. 6 is a schematic diagram illustrating an electrode pattern of sensing units according to another embodiment of the invention.

FIG. 6 is a schematic diagram illustrating an electrode pattern of sensing units according to another embodiment of the invention. Referring to FIG. 1 and FIG. 6, in the present embodiment, an arrangement of first sensing electrodes 413 and second sensing electrodes 415 in the active area 212 is similar to that in the embodiment of FIG. 5, and a major difference between the two is that sides of the first sensing electrodes 413 and the second sensing electrodes 415 are extension curved sides having different slopes, respectively, as shown in FIG. 6.

Specifically, in the present embodiment, the first sensing electrodes 413 and the second sensing electrodes 415 of a sensing unit 412 is arranged in staggered arrangement. The first sensing electrode 413 and the second sensing electrode 415 include extension curved sides S3 and S4 respectively. Take the extension curved side S3 as an example, in this example, the extension curved side S3 include three turning line segments including one turning line segment located in the non-edge area (e.g., the active area between two edge areas), and another two turning line segments located in the edge area close to the non-active area and the edge region away from the non-active area, respectively. In the non-edge area, the extension curved sides S3 of the first sensing electrodes 413 extend along another direction opposite to the direction D by a first slope. In the edge area, the extension curved sides of the first sensing electrodes 413 extend along the another direction by a second slope different from the first slope. In other words, in the extension curved side S3, the slopes of the two turning line segments located in the edge area are different from the slope of the turning line segment located in the non-edge area, and the slopes of the two turning line segments located in the edge area may be identical or not identical to each other, which are not particularly limited in the invention. Further, in the present embodiment, the second sensing electrodes 415 extend in the active area 212 in accordance with an extending manner of the first sensing electrodes 413.

As similar to the embodiment of FIG. 2, in the present embodiment, when the touch gesture moves from the active area 212 towards the fan-out area 214 of the non-active area, the ratio of the area of the first sensing electrodes 413 touched by the touch gesture and the touch area generated by the touch gesture touched on the touch panel module 100 is greater than a second threshold. When the touch gesture moves from the fan-out area 214 of the non-active area towards the non-touch panel area 220, the ratio of the area of the first sensing electrodes 413 touched by the touch gesture and the touch area generated by the touch gesture touch on the touch panel module 100 is greater than a first threshold. Enough teaching, suggestion, and implementation illustration regarding above said operations may be obtained from the embodiment of FIG. 2, which is not repeated hereinafter. In the present embodiment, the layout scheme of the electrode pattern in the fan-out area 214 of the non-active area is different from that in the embodiment of FIG. 2. Therefore, values of the first threshold and the second threshold in the present embodiment may also be different accordingly, and the invention is not limited thereto.

It is worth mentioning that, the embodiment of FIG. 6 may also be properly combined with the embodiments of FIG. 2 to FIG. 4. That is to say, in the embodiment of FIG. 6, the first sensing electrodes 413 may further be located in the non-touch panel area 220 to compensate the degree of linearity at the edge region of the touch panel 110, so as to improve the accuracy for determining the touch position by the touch controller 120. Alternatively, in the embodiment of FIG. 6, a layout scheme of the electrode pattern in the fan-out area 214 of the non-active area may also be identical or not identical to those in the embodiments of FIG. 2 to FIG. 4.

It should be noted that, in the exemplary embodiment of FIG. 1, the sensing units 112 are illustrated by using the electrode pattern of the second sensing unit 112A for example, but the invention is not limited thereto. In other embodiments, a combination of the sensing units 112 may be identical or not identical to combinations illustrated in FIG. 2 to FIG. 6.

In summary, in the exemplary embodiment of the invention, the first sensing electrodes are further located in the non-touch panel area. When the touch gesture moves from the center area of the touch panel towards the edge area, the area of the first sensing electrodes touched by the touch gesture increases significantly. Accordingly, the ratio of the area of the first sensing electrodes touched by the touch gesture and the touch area generated by the touch gesture touched on the touch panel module may also increase significantly to compensate the degree of linearity, so as to improve the accuracy for determining the touch position by the touch controller.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel module, comprising a touch panel area and a non-touch panel area, and the touch panel module comprising:
a touch panel, comprising a plurality of sensing units configured to sense a touch gesture, each of the sensing units comprising a plurality of first sensing electrodes and a plurality of second sensing electrodes, an electrode area of the first sensing electrodes increasing along a direction, and an electrode area of the second sensing electrodes decreasing along the direction, wherein the touch panel is located in the touch panel area, and the touch panel comprises an active area and a non-active area,
wherein the touch gesture touches the touch panel module to generate a touch area, a ratio of an area of the first sensing electrodes touched by the touch gesture and the touch area increases along the direction, and the ratio is greater than a first threshold when the touch gesture moves from the non-active area towards the non-touch panel area along the direction.

2. The touch panel module of claim 1, wherein the ratio is greater than a second threshold when the touch gesture moves from the active area towards the non-active area along the direction.

3. The touch panel module of claim 1, wherein an area occupied by the first sensing electrodes in the non-active area is greater than an area occupied by the second sensing electrodes in the non-active area.

4. The touch panel module of claim 3, wherein the sensing units comprise a first sensing unit, the first sensing electrodes of the first sensing unit are electrically connected to a touch controller by using a first conductive wire in the non-active area, and the second sensing electrodes of the first sensing unit are electrically connected to the touch controller by using a second conductive wire in the non-active area.

5. The touch panel module of claim 4, wherein the first sensing electrodes of the first sensing unit further extend into the non-active area in order to substantially fill a corresponding area in the non-active area excluding the first conductive wire and the second conductive wire.

6. The touch panel module of claim 3, wherein the sensing unit comprising a second sensing unit, and the first sensing electrodes of the second sensing unit extend from the active area into the non-active area.

7. The touch panel module of claim 6, wherein the second sensing electrodes of the second sensing unit extend from the active area into the non-active area, and separate the first sensing electrodes extended to the non-active area.

8. The touch panel module of claim 6, wherein the first sensing electrodes extended to the non-active area form a lumped electrode.

9. The touch panel module of claim 1, wherein the first sensing electrodes are further located in the non-touch panel area.

10. The touch panel module of claim 9, further comprising:
a touch controller, electrically connected to the touch panel, and configured to determine a touch position corresponding to the touch gesture on the touch panel based on the ratio of the area of the first sensing electrodes touched by the touch gesture.

11. The touch panel module of claim 10, wherein the touch controller is located in the non-touch panel area.

12. The touch panel module of claim 1, wherein the first sensing electrodes and the second sensing electrodes of each of the sensing units are arranged in staggered arrangement, and each of the first sensing electrodes has an extension bevel side,
the extension bevel sides of the first sensing electrodes extend along another direction opposite to the direction by a slope in the active area, and the second sensing electrodes extend in the active area in accordance with an extending manner the first sensing electrodes.

13. The touch panel module of claim 1, wherein the first sensing electrodes and the second sensing electrodes of each of the sensing units are arranged in staggered arrangement, and each of the first sensing electrodes has an extension curved side, the active area comprises an edge area and a non-edge area,
the extension curved sides of the first sensing electrodes extend along another direction opposite to the direction by a first slope in the non-edge area, the extension curved sides of the first sensing electrodes extend along the another direction by a second slope different from the first slope in the edge area, and the second sensing electrodes extend in the active area in accordance with an extending manner of the first sensing electrodes.

14. The touch panel module of claim 1, wherein the non-active area of the touch panel surrounds the active area, and the direction is a direction pointing from a center area of the active area towards the non-active area.

15. A touch panel module, comprising a touch panel area and a non-touch panel area, and the touch panel module comprising:
a touch panel, comprising a plurality of sensing units configured to sense a touch gesture, each of the sensing units comprising a plurality of first sensing electrodes and a plurality of second sensing electrodes, an electrode area of the first sensing electrodes increasing along a direction, and an electrode area of the second sensing electrodes decreasing along the direction, wherein the touch panel is located in the touch panel area, and the touch panel comprises an active area and a non-active area,
wherein a ratio of an area of the first sensing electrodes located in the non-touch panel area to an area of the sensing unit is greater than a ratio of an area of the first sensing electrodes located in the active area and the area of the sensing unit.

16. The touch panel module of claim 15, wherein the ratio of the area of the first sensing electrodes located in the non-touch panel area to the area of the sensing unit s greater than a ratio of an area of the first sensing electrodes located in the non-active area and the area of the sensing unit.

17. The touch panel module of claim 15, wherein the first sensing electrodes of the first sensing unit substantially fills a corresponding area in the non-active area excluding a first conductive wire electrically connected the first sensing electrodes and a touch controller and a second conductive wire electrically connected the second sensing electrodes and the touch controller.

18. A touch panel module, comprising a touch panel area and a non-touch panel area, and the touch panel module comprising:
   a touch panel, comprising a plurality of sensing units configured to sense a touch gesture, each of the sensing units comprising a plurality of first sensing electrodes and a plurality of second sensing electrodes, an electrode area of the first sensing electrodes increasing along a direction, and an electrode area of the second sensing electrodes decreasing along the direction, wherein the touch panel is located in the touch panel area, and the touch panel comprises an active area and a non-active area,
   wherein the first sensing electrodes of the first sensing unit further extend into the non-active area to substantially fill a corresponding area in the non-active area excluding a first conductive wire connecting to the first sensing electrodes and a second conductive wire connecting to the second sensing electrodes.

* * * * *